July 18, 1944.  E. LEVEILLE  2,353,911

LEVEL INDICATOR

Filed Nov. 10, 1943

Inventor:
Emile Leveillé
By
Attorney

Patented July 18, 1944

2,353,911

UNITED STATES PATENT OFFICE 2,353,911

LEVEL INDICATOR

Emile Leveille, Montreal, Quebec, Canada

Application November 10, 1943, Serial No. 509,727
In Canada November 17, 1942

2 Claims. (Cl. 33—215)

The present invention pertains to a perpendicular level indicator, the perpendicular being maintained by a needle rather than a screw.

The principal object of the invention is to provide an instrument for determining if a surface is level and, consequently, to determine differences in height.

Another object of the invention is to provide an instrument of high precision and provided with a vernier for measuring to one-tenth of the graduations showing the angle.

Still another object of the invention is to provide an indicator on which the reading may be made above or at the side of the instrument. These several objects are realized in a construction that is simple, durable and inexpensive.

In the accomplishment of these objects, the invention comprises an elongated member constituting a frame and constructed to be viewed at one of its faces. The center of this member is hollow to receive a casing having a central shaft. This shaft serves as a central pivot for a needle indicator held vertical by a weight at one of its ends. With the shaft turns a vernier which cooperates with the casing, the latter being graduated in degrees. On the vertical face of the casing is provided a frosted window to illuminate the graduations, and the upper corner of the casing is apertured to receive a lens through which the scale is read.

The invention is fully disclosed by way of example in the following description and in the accompanying drawing in which.

Reference to these views will now be made by use of like characters which are employed to designate corresponding parts throughout.

Figure 2:
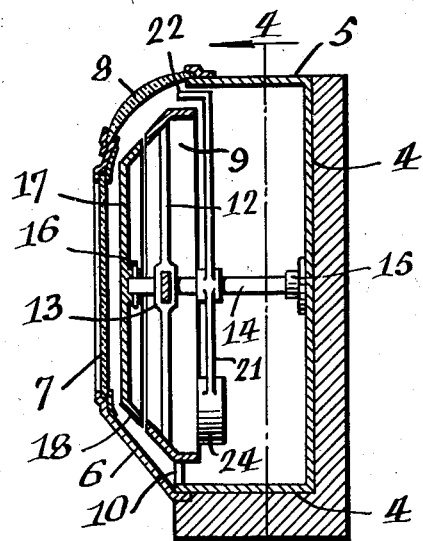
Figure 2 is a vertical section at the center.
Figure 4:
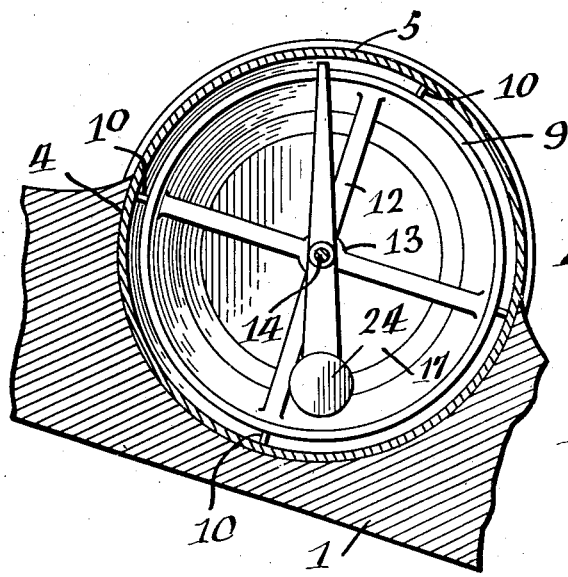
Figure 4 is a section on the line 4—4 of Figure 2.

The device includes a mounted or frame 1 of elongated configuration having its lower face 2 planed smooth and its top shouldered down at 3 toward the ends. The center of the frame is formed with a cavity 4 in one of the lateral faces to receive a cylindrical casing 5. The cover 6 of the casing is a truncated cone and protrudes forwardly from the member 1 as clearly shown in Figure 2. The face of the cover is provided with a frosted window 7 to illuminate the interior of the casing, or at least the visible parts. The oblique top portion of the cover is apertured to receive a lens 8 which permits a magnified view of the scale presently to be described. A ring 9, of a diameter less than that of the casing 5, is mounted in such a manner that its cylindrical body lies in the casing and its conical forward portion lies in the cover 6. The ring is held in place by short fingers 10 spaced apart and attached to the casing. The outer surface of the ring has degree graduations 11 on the conical portion, and the interior is provided with cross strips 12 formed as a bearing 13 at the intersection. The bearing receives a shaft 14 having one end journaled in another bearing 15 fixed to the bottom of the casing 5. The other end of the shaft is pinned at 16 to the center of a disk 17 having its edge formed with a conical flange 18 disposed as a prolongation of the conical surface of the ring 9. On its outer surface and adjacent to the ring 9, the flange 18 is graduated at 20 as a vernier in conjunction with the graduations 11 for highly accurate readings.

Figure 1:
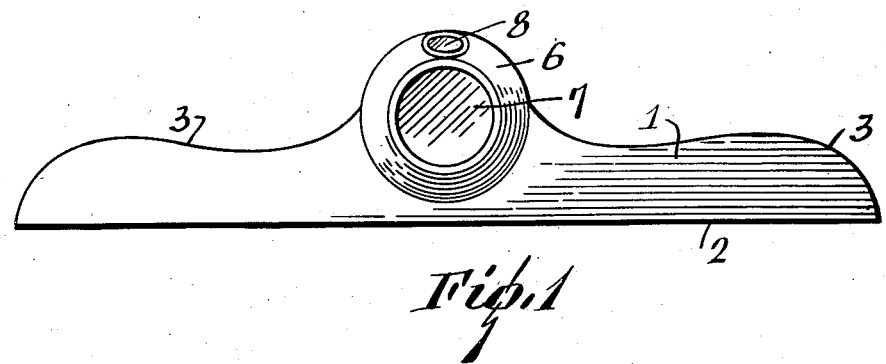
Figure 1 is an elevation of the device.
Figure 3:
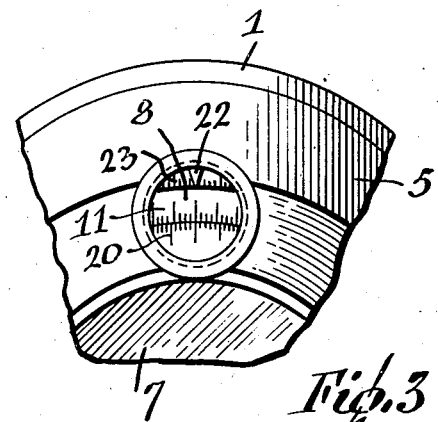
Figure 3 is a detail elevation of the upper corner, viewed obliquely.

Inward of the ring 9, the shaft 14 supports a thin metal needle 21 fixedly mounted thereon. One end of the needle is formed as a point 22 bent over the cylindrical portion of the ring 9, which carries graduations 23, as shown in Figure 3. These graduations correspond to the graduations 11 previously mentioned. Finally, the lower end of the needle 21 is provided with a weight 24 which serves to hold the needle vertical.

In the use of the device, the finished surface 2 is placed on the surface to be measured with respect to the horizontal. The lens 8, being oblique, permits the user to view the scale either from the front or the side. On a surface that is not horizontal, the needle 21 is swung by its weight 24 to a vertical position, turning with it the shaft 14 and the disk 17 relatively to the ring 9. The pointer 22 and the vernier scale 20 indicate the inclination on the scales of the member 19.

Although a specific embodiment of the invention has been illustrated and described, it will be understood that various alterations in the details of construction may be made without departing from the scope of the invention as indicated by the appended claims.

What I claim as my invention is:

1. A level indicator comprising a mounting having a plane bottom surface, a casing set in one of the lateral faces of said mounting, a graduated ring fixed in said casing, a shaft journalled in said ring, a weighted pointer fixed on said shaft and cooperating with the graduations on said ring, a disk fixed on said shaft adjacent to said ring, and cooperating vernier graduations on said disk and ring.

2. A level indicator comprising a mounting having a plane bottom surface, a casing set in one of the lateral faces of said mounting, a graduated ring fixed in said casing, a shaft journalled in said ring, a weighted pointer fixed on said shaft and cooperating with the graduations on said ring, said ring having a conical portion, a disk fixed on said shaft and having a conical surface in prolongation of said portion, and cooperating vernier graduations on said conical portion and conical surface.

EMILE LEVEILLE.